United States Patent [19]

Milkovich

[11] E Patent Number: Re. 31,770

[45] Reissued Date of Patent: Dec. 18, 1984

[54] DERIVATIZATION OF STAR-BLOCK COPOLYMERS

[75] Inventor: Ralph Milkovich, Paoli, Pa.

[73] Assignee: Atlantic Richfield Company, Los Angeles, Calif.

[21] Appl. No.: 570,567

[22] Filed: Jan. 13, 1984

Related U.S. Patent Documents

Reissue of:

[64] Patent No.: 4,417,029
Issued: Nov. 22, 1983
Appl. No.: 289,556
Filed: Aug. 3, 1981

[51] Int. Cl.[3] ..... C08F 297/04
[52] U.S. Cl. ..... 525/314; 525/902
[58] Field of Search ..... 525/314, 901

[56] References Cited

U.S. PATENT DOCUMENTS

| | | | |
|---|---|---|---|
| 3,280,084 | 10/1966 | Zelinski | 260/83.7 |
| 3,644,322 | 2/1972 | Farrar | 260/94.2 |
| 3,755,283 | 8/1973 | Fletcher | 260/93.5 |
| 3,786,116 | 1/1974 | Milkovich | 260/885 |
| 3,985,830 | 10/1976 | Fetters | 260/880 B |
| 4,010,226 | 3/1977 | Crossland | 260/880 B |
| 4,169,115 | 9/1979 | Tung | 525/314 |
| 4,180,530 | 12/1979 | Bi | 525/98 |
| 4,304,886 | 12/1981 | Bean | 525/901 |

*Primary Examiner*—Paul R. Michl
*Attorney, Agent, or Firm*—Lewis J. Young

[57] ABSTRACT

Star-block copolymers having functional groups associated with the nucleus of the copolymers have been prepared. The copolymers of from 10–90% by weight of a monovinyl aromatic compound and 10–90% by weight of a conjugated diene have at least 3 arms connected to a polyvinyl aromatic nucleus and up to the same number of polar functional groups attached to said nucleus as there are arms attached thereto.

51 Claims, No Drawings

DERIVATIZATION OF STAR-BLOCK COPOLYMERS

Matter enclosed in heavy brackets [ ] appears in the original patent but forms no part of this reissue specification; matter printed in italics indicates the additions made by reissue.

BACKGROUND OF THE INVENTION

The present invention relates to star-block polymers and copolymers of monovinylaromatic compounds and conjugated dienes having functional groups associated with the nucleus of the copolymers.

Highly branched block copolymers, sometimes called star-block copolymers, are known in the art of anionic polymerization. These star-block copolymers are prepared by first forming linear block polymers having an active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound. In the case where the polyfunctional compound is divinylbenzene, the coupling reaction results in a star-block having a cluster of living anionic species at the nucleus of the star. It is at this point that the reactive star anions are normally terminated by reaction with proton active reagents, such as alcohols, to yield the final polymer.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Farrar, U.S. Pat. No. 3,644,322, teaches to make star-block copolymers having several arms wherein half of the arms are grown out from the nucleus and then terminated with carbon dioxide or epoxides to form polar functional groups at the outer extremities of these arms.

Fletcher, U.S. Pat. No. 3,755,283, prepares hydroxyphenyl terminated star-block copolymers by using lithium p-lithiophenoxide as an initiator of linear chains, which chains are then coupled with polyfunctional coupling agents to form the star-block copolymers having the functional groups distant from the nucleus.

Milkovich et al, U.S. Pat. No. 3,786,116, teaches the end capping of linear block copolymers by reacting the carbon-to-lithium ends with various functional groups-producing termination agents. These agents, primarily produced by reacting halogen-containing compounds having a polymerizable moiety such as an olefinic group or an epoxy group, produced polymerizable block copolymers named macromonomers.

Fetters et al, U.S. Pat. No. 3,985,830, discloses a product having a nucleus of more than one molecule of m-divinylbenzene and at least three polymeric arms, each being a block copolymer of conjugated diene and monovinyl aromatic monomers wherein said conjugated diene block is linked to said nucleus.

Crossland et al, U.S. Pat. No. 4,010,226, teaches to form star-block copolymers using divinylbenzene as coupling agent, growing new arms from this star-blocked copolymers, which arms are 5000 to 1,000,000 molecular weight and then capping these longer arms at the extremities away from the nucleus wtih various reagents which react with the carbon-to-lithium bonds.

Tung et al, U.S. Pat. No. 4,169,115, teaches to form linear block copolymers which are then terminated by adding an episulfide. The terminated copolymer is then copolymerized with styrene by a free-radical initator to form block copolymers.

Bi et al, U.S. Pat. No. 4,180,530, teaches to form star-block copolymers having 60–95% by weight of a monovinyl aromatic compound and 5–40% by weight of a conjugated diene and having general formula $(A—A'/B—B')_mX—B'—B/A')_n$, where A is a block of vinyl aromatic compound, A'/B or B/A' is a block of random copolymer of the vinyl aromatic compound and the conjugated diene, B' is a block of conjugated diene monomer, m and n are integers whose sum is between 3 and 20, and X is the radical of a polyfunctional coupling agent forming the nucleus of the bimodal star-block copolymer.

SUMMARY OF THE INVENTION

It has now been found that star-block copolymers formed with polyvinyl aromatic compounds as the coupling agent can be improved by reacting the star-block copolymer, prior to termination of the living anions formed at the nucleus, with a derivatization agent which reacts with the central carbon-to-lithium bonds to form active polar functional groups on the nucleus of the star-block copolymers.

DETAILED DESCRIPTION OF THE INVENTION

The polymers of this invention are star-block copolymers of from 10 to 90% by weight of a monovinyl aromatic compound and 10 to 90% by weight of a conjugated diene of 4 to 8 carbon atoms and said star-block copolymers having at least three arms connected to a polyvinyl aromatic compound nucleus and up to the same number of polar functional groups attached to said nucleus as there are arms attached thereto.

The polymers are prepared by polymerizing monovinyl aromatic compounds and/or conjugated dienes in an inert hydrocarbon solvent with a hydrocarbyllithium initiator and coupling the resulting block polymer or copolymer chains with polyvinyl aromatic compounds. At this point the living anionic chains transfer the active sites to the polyvinyl aromatic compound nucleus to form a cluster of living anionic species at the center of the star-block polymer. In the known process for preparing star-block polymers, these living anionic species are terminated with proton active substances, such as alcohols, to yield the protonated polymers. In the present invention, the living anionic species are reacted, prior to termination, with a derivatization agent to put polar functional groups on the nucleus of the star-block copolymers.

The structure of the arms of the star-block copolymers can be any of the known block structures made up of poly (vinyl aromatic compound) and/or poly (conjugated diene). Included in these structures are the homopolymer blocks, the true copolymer blocks, the random copolymer blocks, the tapered copolymers blocks and mixtures of these. The arms themselves of any one star-block copolymer may be mixed in structure, such as the bimodal or trimodal copolymers described in U.S. Pat. Nos. 4,180,530; 4,248,980; 4,248,981; 4,248,982; 4,248,983, and 4,248,984, all to Bi et al and incorporated herein by reference. The molecular weights of the various arms will normally vary between 10,000 and 200,000, but may be larger.

Also within the scope of the invention are the hydrogenated star-block copolymers. The hydrogenation may be carried out by any known means. However, the conditions of hydrogenation must be mild enough to hydrogenate the diene portion of the arms without hydrogenating the polar functional groups. The hydrogenation should be carried out to reduce at least 90% of any olefinic bonds in the arms.

The number of arms in the star-block copolymers will be at least three, but not more than 20. Preferably, those polymers having between 5 and 15 arms will be used.

The monovinyl aromatic compound useful in the invention is preferably styrene, but may be alkyl substituted styrenes which have similar copolymerization characteristics, such as, alphamethylstyrene and the ring substituted methylstyrenes, ethylstyrenes, and t-butylstyrene.

The amount of a monovinyl aromatic compound useful in the invention is between 10 and 90% by weight based on total monomers. Compositions containing from 10 to 55% by weight have properties of thermoplastic elastomers, whereas those containing from 60 to 90% by weight have properties of thermoplastic resins.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The hydrocarbyllithium initiators useful in the invention are the known alkyllithium compounds, such as methyllithium, n-butyllithium, sec-butyllithium; the cycloalkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. The total amount of initiator used depends on the molecular weight and number of polymer chains desire.

The polymerization is conducted in an inert hydrocarbon solvent such as isobutane, pentane, cyclohexane, cyclopentane, benzene, toluene, xylene and the like. The polymerization is carried out in the absence of air, moisture, or any other impurity which is known to be detrimental to anionic catalyst systems. The temperature of polymerization may be conventionally from 0° - 120° C., and preferably between 40° and 80° C.

The polyvinyl aromatic compounds useful as coupling agents are preferably the divinylbenzenes such as ortho-, meta-, or para-divinylbenzene, or mixtures thereof. The polyvinyl naphthalenes and polyvinyl biphenyls can also be used.

In the case of difunctional agents which polymerize during the coupling reaction, such as divinyl-benzene, the amounts of agent to be used must be determined for the conditions of reaction, since the number of equivalent functional sites is variable. However, the amounts will vary only from 0.5 to 15.0 equivalents, and preferably 1.0 to 8.0 equivalents, of divinylbenzene per equivalent of alkyllithium initiator.

The polar functional groups are produced by the reaction of a derivatization agent with the living anionic species at the nucleus of the star-block copolymers.

The derivatization agents useful in the invention are those low-molecular weight compounds which are known to react with lithiated anions. These compounds include carbon dioxide; carbon disulfide; sulfur dioxide; alkylene oxides, such as ethylene oxide, propylene oxide, and styrene oxide; aldehydes, such as formaldehyde, acetaldehyde, propionaldehyde, benzaldehyde, and glyoxal; ketones, such as acetone, ethylmethylketone, diethylketone and acetophenone; episulfides, such as ethylene episulfide, propylene episulfide and styrene episulfide; halogens, such as chlorine, bromine, and iodine; epihalohydrins, such as epichlorohydrin, epibromohydrin and epiiodohydrin; halosilanes, such as chlorotrimethylsilane, dichlorodimethylsilane, dichloromethylphenylsilane, and bromotriphenylsilane; halophosphines, such as chlorodimethylphosphine, chlorodiphenylphosphine, and dichlorophenylphosphine; phosphorus halides, such as phosphorus trichloride, phosphorus tribromide, and phosphorus pentachloride; phosgene; p-haloaniline, such as p-chloroaniline; cyclic amides, such as caprolactam; unsaturated amides, such as acrylamide and methacrylamide; isocyanates, such as phenylisocyanate, methylisocyanate and ethylisocyanate; diisocyanates, such as 2,4-toluenediisocyanate and hexamethylene diisocyanate; dicarboxylic acid dihalides, such as oxalyl chloride, malonoyl dichloride, sebacoyl dichloride, fumaroyl dichloride and phthaloyl dichloride; bishaloformates, such as ethylenebischloroformate and p-phenylenebischloroformate; disulfonyl halides, such as 1,2-ethane disulfonyl chloride and 1,3-benzene disulfonyl bromide; and cyclic siloxanes, such as octamethyltetrasiloxane. These agents are useful in amounts equivalent to or greater than the amount of initiator used to prepare the star-block copolymers. If the agent has only one reactive site, then the equivalent amount of agent can be used without harmful side reactions. However, where more than one reactive site is present, such as for example in phosgene, then it is necessary to use an excess of the agent to ensure only one molecule of reagent reacts with each lithiated anion at the nucleus.

The reactions of the derivatization agents with the polymeric anionic sites are shown below, wherein P is any unterminated star-block copolymer having 3 to 20 arms and up to an equal number of anionic sites at the nucleus. The term "up to an equal number of sites" is used because either some of the sites may be inadvertently terminated by impurities in the reaction mixture or it may be desired to purposely terminate a portion of the sites to regulate the functionality of the final derivatized polymers. Although only 1 reactive site is shown in the following products, it will be remembered that multiple sites will normally be present in the molecules. In all instances X is chlorine, bromine or iodine and R is either alkyl having 1 to 6 carbon atoms or phenyl. R'' is alkylene having 1 to 8 carbon atoms or phenylene (o,m, or p).

| Reactant | Products |
|---|---|
| $CO_2$ | $P-CO_2H$ |
| $CS_2$ | $P-CS_2H$ |
| $SO_2$ | $P-SO_2H$ |
| $X_2$ | $P-X$ |
| 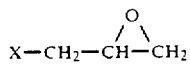 | 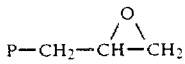 |
| $X-SiR_3$ | $P-SiR_3$ |

-continued

| Reactant | Products |
|---|---|
| $X-PR_2$ | $P-PR_2$ (second P is phosphorus) |
| $X-PX_2$ | $P-PX_2$ (second P is phosphorus) |
| $Cl-CO-Cl$ | $P-COCl$ |
| $X-C_6H_4NH_2$ | $P-C_6H_4NH_2$ |
| 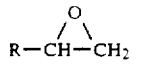 | $P-CH(R)-CH_2OH$ + $P-CH_2-CH(R)-OH$ |
| $R-CHO$ | $P-CH(R)-OH$ |
| $R-C(=O)-R'$ | $P-C(R)(R')-OH$ (R and R' may be same or different) |
| 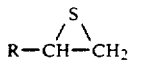 | $P-CH(R)-CH_2-SH$ + $P-CH_2-CH(R)-SH$ |
| 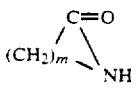 | $P-C(=O)-(CH_2)_m-NH_2$ + $P-NH-(CH_2)_m-C(=O)-CH$ (m is 1 to 6) |
| $CH_2=C(R)-C(=O)-NH_2$ | $P-CH_2-CHR-C(=O)-NH_2$ |
| $RNCO$ | $P-C(=O)-NHR$ |
| 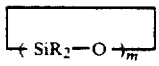 | $P-(SiR_2-O)_m-H$ (m is 4-8) |
| $OCN-R''-NCO$ | $P-C(=O)-NH-R''-NCO$ |
| $X-C(=O)-R''-C(=O)-X$ | $P-C(=O)-R''-C(=O)-X$ |
| $OCH-R''-CHO$ | $P-CHOH-R''-CHO$ |
| $X-S(=O)_2-R''-S(=O)_2-X$ | $P-S(=O)_2-R''-S(=O)_2-X$ |
| $X-C(=O)-O-R''-O-C(=O)-X$ | $P-C(=O)-O-R''-O-C(=O)-X$ |

The presence of the polar functional groups in the star-block copolymers has various usefulness, depending on the composition of the arms of the copolymers.

Thus, copolymers of 10 to 55% styrene and 45 to 90% butadiene having carboxyl groups at the nucleus have increased processibility compared to the same copolymer without the carboxyl groups. Copolymers of 10 to 55% styrene and 45 to 90% isoprene having carboxyl groups at the nucleus have increased shear adhesion to Kraft paper compared to the same copolymer without the carboxyl groups at the nucleus. Copolymers of 60 to 90% styrene and 10 to 40% butadiene having carboxyl groups at the nucleus are much more compatible with polar fillers than uncarboxylated equivalents. The styrene/isoprene copolymers having 60 to 90% styrene can be made into efficient adhesives for laminating polar polymers into built-up laminates.

The following examples are given to illustrate the invention, but not to limit the claims. All parts and percentages are by weight unless otherwise specified.

EXAMPLE I

A one gallon stirred reactor was charged wit 1,790 g. of purified cyclohexane and heated to 60° C. A trace of diphenylethylene (0.2 g.) was added to the cyclohexane by means of a hypodermic needle. A solution of secbutyl-lithium in cylcohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 10.2 m. moles of secbutyllithium and 275 g. of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 31,000. At this point, 323 g. of butadiene was added to the reactor and the whole, mixture held for 60 minutes to complete the polymerization of the butadiene. The diblock arms thus formed were analyzed by refractive index and found to be 46% by weight styrene and 54% butadiene. The diblock arms had $M_n$ of 86,000. There was then added 14.7 g. of divinylbenzene of 55% purity (6.1 DVB/RLi) and the whole was held for 1-2 hours at 70° C. to complete the linking reaction. $M_n$ was 931,000 for the star-block copolymer at this point of the reaction. This indicates that the star-block copolymers had about 10.8 arms per molecule. At this point, there remained one active lithium site at the nucleus of the copolymer for each arm attached thereto, as indicated by the red-brown color of the solution. Gaseous carbon dioxide was introduced into the reactor and allowed to react for about 3 minutes, or until the solution was colorless. The resulting polymer was terminated by the addition of 2 ml. of a 1:1 mixture of hydrochloric acid (38% solution); isopropyl alcohol. The polymer was stabilized with 0.5 part of 2,6-ditert-butyl-4-methylphenol per 100 parts by weight of polymer. This carboxylated polymer was designated base elastomer I. A control sample was prepared as above except, instead of adding the carbon dioxide, the polymer was terminated by the addition of methanol to form the control having no carboxyl groups.

Additional elastomers were prepared by the above method except that, instead of adding the carbon dioxide, in one case 5 mls ethylene oxide was added and in another case 5 mls of propylene oxide was added. The derivatized samples were designated elastomer IEO and elastomer IPO respectively. Although the functional groups in IPO is designated "Secondary alcohol" in Table I, it will be recognized that the addition of propylene oxide probably gives a mixture of primary and secondary alcohol groups.

Oil extended elastomer was prepared using 50 parts of Shellflex 371 oil per 100 parts of each of the neat star-block polymers. These were then used in a hard unit sole type formulation as follows:

| Ingredient | Parts (by weight) |
|---|---|
| Oil extended elastomer | 100.0 |
| Shellflex 371 oil | 60.5 |
| Crystal Polystyrene | 15.5 |
| Resin 18-290 | 15.2 |
| Hi—Sil 233 | 20.0 |
| Irganox 1010 | 0.3 |
| DLTDP | 0.2 |
| Tinuvin P | 0.3 |

The crystal polystyrene was Cosden 500S, a low molecular weight polystyrene sold by Cosden Oil & Chemical Company. The Tinuvin P is hydroxymethylphenyl benzotriazole, a stabilizer against ultraviolet light sold by Ciba-Geigy. Hi-Sil 233 is an amorphous silica sold by PPG Industries. Irganox 1010 is a hindered phenol antioxidant sold by Ciba-Geigy. DLTDP is the stabilizer, dilaurylthiodipropionate, sold by Cincinnati Milacron. Comparison of the hard unit sole compounds is shown in Table I.

TABLE I

| Functional Group | Melt Index Cond E. (g/10 min) | Lorenzin Screw (amps) |
|---|---|---|
| Carboxylic Acid (Sample I) | 18 | 28 |
| Primary Alcohol | 13 | 22 |
| Secondary Alcohol (Sample IPO) | 10 | 22 |
| Control | 5 | 32-34 |

The increased processibility of the compound made with derivatized elastomer is shown by the increased melt index and the reduction in amperage needed to process the compounds in a screw extruder at 350° F. and 250 rpm in the Lorenzin B-1 extruder. Other properties (measured but not shown) which were essentially unchanged by the carboxyl and hydroxyl groups were Shore A hardness, Ross Flex values, Taber Wear, abrasion results, tensile strength and elongation at break.

EXAMPLE II

A one gallon stirred reactor was charged with 1820 g. of purified cyclohexane and heated to 80° C. The solvent was treated with diphenylethylene and sec-butyllithium to remove impurities as in Example I. Into the closed reactor was charged 13.2 m mole of sec-butyllithium and 145 g. of styrene and the reactor held at 80° C. for 10 minutes. The polystyrene was completely polymerized to a polymer of $M_n$ 12,300. An additional 13.2 m mole of sec-butyllithium was then added and a continuous feed of 836 g. of isoprene was added over a period of 30 minutes using a controlled volume minipump. When the last of the isoprene was added, the whole mixture was maintained at 80° C. for an addtional 5 minutes. At this point, the mixture contained equal amounts of two different polymeric chains having lithium end groups. One group of chains consisted of a diblock copolymer having polystyrene blocks of $M_n$ 12,300 followed by polyisoprene blocks of $M_n$ 52,450. The other group of chains consisted of polyisoprene of $M_n$ 52,450. In both cases, lithium as attached to the isoprene end of the chains. The solution containing these living polymer chains was then reacted with 18.9 g. of a 55% solution of divinylbenzene (DVB/RLi=5.5) at 80° C. for 45 minutes to form a star-block copolymer having statistically equal numbers of the two types of arms. The star-block copolymer had $M_n$ 586,000, indicating the presence of 10 arms, 5 of the poly(styrene-isoprene) structure, and 5 of the poly-isoprene structure. The overall composition of the copolymer was 15% by weight of styrene and 85% by weight of isoprene. The red-brown solution indicated there were still active lithium sites at the nucleus of the star-block copolymers.

Gaseous carbon dioxide was introduced to the solution and allowed to react until the solution was colorless (about 3 minutes). The resulting carboxyl capped star-block copolymer was terminated with 2 ml. of a 1:1 mixture of hydrochloric acid (38%): isopropyl alcohol and stabilized with 0.5 g. 2,6-ditert-butyl-4-methylphenol per 100 g. of polymer, as before. This bimodal star-block elastomer was designated elastomer II. A control polymer was made by the same process except instead of adding carbon dioxide, the living star was terminated with methanol as before.

Elastomers IIEO and IIPO were prepared by the above process using ethylene oxide and propylene oxide, respectively, to replace the carbon dioxide as derivatization agent.

The elastomers and the control were formulated in adhesive formulations as follows:

| Formulation | A | B |
|---|---|---|
| Star Elastomer | 100 | 100 |
| Tackifier | 100 | 100 |
| Oil | — | 20 |
| Butyl Zimate | 2 | 2 |

The tackifier was Wingtack Plus, sold by Goodyear Tire & Rubber Company. The oil was Shellflex 371, a naphthalenic extrude oil sold by Shell Chemical Company. Butyl Zimate is zinc dibutyl dithiocarbonate, an accelerator sold by R. T. Vanderbilt Company. These formulations were tested for shear adhesion (PSTC-7). The results are shown in Table II.

TABLE II

| Functional Group | Formulation | Shear Adhesion to Kraft (min.) | 180° Peel Adhesion (oz./in.) |
|---|---|---|---|
| Control | A | 388 | 70 |
| | B | 56 | 46 |
| Carboxyl(II) | A | 1900 | 64 |
| | B | 239 | 49 |
| Primary Alcohol (IIEO) | A | 516 | 86 |
| | B | 63 | 56 |
| Secondary Alcohol (IIPO) | A | 335 | 89 |
| | B | 82 | 60 |

The data shows a substantial increase in the shear adhesion to Kraft paper from 388 min. for the control elastomer to 1900 min. for the carboxylated star-block copolymer using the unoiled adhesive formulation. Even the oiled formulation gave 4-fold increase in the shear adhesion. The hydroxyl group had little or no effect on the shear adhesion.

In the case of 180° Peel adhesion, the carboxyl groups did not improve the adhesion over that of the control, but both of the elastomers containing hydroxyl groups mixed a marked improvement over the control. Other properties, such as rolling ball tack and probe tack were unaffected by either functional groups.

EXAMPLE III

The procedure of Example I was repeated up the point of the addition of carbon dioxide. Instead of $CO_2$, 6.2 g. of octamethyltetrasiloxane was added to the unterminated star-block copolymer. The product was an 11-armed star-block copolymer having 46% by weight styrene and 54% by weight butadiene. The $M_n$ was 963,000 for the star-block and each arm was made up of polystyrene blocks of $M_n$ 33,100 and polybutadiene blocks of $M_n$ 54,700. The functional groups were siloxanol groups of formula $—Si(CH_3)_2O—H$.

EXAMPLE IV

A star-block polymer having trimodal distribution of molecular structure in the arms can be prepared and derivatized as follows:

Into a closed reactor is charged 5.0 m. moles of n-butyllithium and 365 g. of styrene and the reactor is held at 70° C. for 20 minutes to form A'-Li segments, where A' is polystyrene. Then, an additional 6 m. moles of n-butyllithium and 220 g. of styrene is added and the reactor held at 70° C. for 20 minutes to polymerize all of the styrene and form a mixture of segments A-Li and A''-Li where the A-Li segments are formed by the continued growth of the A'-Li segments and the A'' segments are formed by the addition of styrene to the newly added initiator. At this point, an additional 11.0 m. moles of n-butyllithium is added and a continuous feed of 144 g. of butadiene is added over 90 minutes using a controlled volume mini-pump. About 2 minutes after the start of the butadiene feed, a charge of 115 g. of styrene is added. When the last of the continuous feed is added, an additional 63 g. of butadiene is added and the whole mixture held for 30 minutes. This forms a mixture of linear segments, A-B/A'''-B'-Li', A''-B/A'''-B'-Li, and B/A'''-B'-Li, where B/A''' represents a random copolymer block and B' represents a polybutadiene block. These segments will be present in the mole ratio of 20/30/50, respectively. The three segments will have $M_n$ of about 110,000, 37,000, and 17,000, respectively. The addition of 11.0 g. of divinylbenzene of 53% purity is made and the whole held at 70° C. for 1-2 hours to complete the linking reaction to form a 10-armed star-block copolymer wherein the 10 arms are a statistical mixture of the three types of arms described above. At this point there will be 10 active Li sites on the divinylbenzene nucleus. The addition of acrylamide to the mixture will give up to 10 propionamide ($H_2NCOCH_2CH_2$—) groups attached to the nucleus. Addition of propyl isocyanate will give N-propyl carboxamide ($CH_3CH_2CH_2NHC{:}O$—) groups at the nucleus. The star-block copolymers prepared by this procedure will have 77.2% by weight styrene and 22.8% by weight butadiene, with 83.6% of the total sytrene being in block segments and 16.4% of the total styrene being in the random copolymer portion of the arms.

I claim:

1. Star-block copolymers of from [25] *10* to 90% by weight of a monovinyl aromatic compound and 10 to [75%] *90%* by weight of a conjugated diene of 4 to 8 carbon atoms; said copolymers having at least three arms connected to a polyvinyl aromatic compound nucleus and having polar functional groups attached to said nucleus.

2. The star-block copolymer of claim 1 wherein said polar functional groups are selected from the group consisting of carboxyl, mercaptothiocarbonyl, sulfino, primary alcohols, secondary alcohols, tertiary alcohols, halides, epoxide, silane, phosphine, phosphorus halides, carbonyl chloride, anilines, alkyl amines, mercaptans, ketones, aldehydes, carboxylic acid amides, N-alkyl amides, isocyanates, sulfonyl halides, haloformates, and siloxanols.

3. The star-block copolymer of claim 1 wherein said polar functional groups are carboxyl groups.

4. The star-block copolymer of claim 1 wherein said polar functional groups are mercaptothiocarbonyl groups.

5. The star-block copolymer of claim 1 wherein said polar functional groups are sulfino groups.

6. The star-block copolymers of claim 1 wherein said polar functional groups are primary alcohol groups.

7. The star-block copolymers of claim 1 wherein said polar functional groups are secondary alcohol groups.

8. The star-block copolymers of claim 1 wherein said polar functional groups are tertiary alcohol groups.

9. The star-block copolymers of claim 1 wherein said polar functional groups are halides.

10. The star-block copolymers of claim 1 wherein said polar functional groups are epoxide groups.

11. The star-block copolymers of claim 1 wherein said polar functional groups are silanes.

12. The star-block copolymers of claim 1 wherein said polar functional groups are phosphines.

13. The star-block copolymers of claim 1 wherein said polar functional groups are phosphorus halides.

14. The star-block copolymers of claim 1 wherein said polar functional groups are carbonyl chlorides.

15. The star-block copolymers of claim 1 wherein said polar functional groups are aniline.

16. The star-block copolymers of claim 1 wherein said polar functional groups are alkyl amines.

17. The star-block copolymers of claim 1 wherein said polar functional groups are mercaptans.

18. The star-block copolymers of claim 1 wherein said polar functional groups are ketones.

19. The star-block copolymers of claim 1 wherein said polar functional groups are aldehydes.

20. The star-block copolymers of claim 1 wherein said polar functional groups are carboxylic acid amides.

21. The star-block copolymers of claim 1 wherein said polar functional groups are N-alkyl amides.

22. The star-block copolymers of claim 1 wherein said polar functional groups are isocyanates.

23. The star-block copolymers of claim 1 wherein said polar functional groups are haloformates.

24. The star-block copolymers of claim 1 wherein said polar functional groups are sulfonyl halides.

25. The star-block copolymers of claim 1 wherein said polar functional groups are siloxanols.

26. In a process for preparing star-block copolymers by polymerizing monovinyl aromatic compounds and/or conjugated dienes in an inert hydrocarbon solvent with hydrocarbyllithium initiator and coupling the resulting block polymers or copolymer chains with polyvinyl aromatic compounds, the improvement comprising reacting the star-block copolymers, prior to termination of the living lithium sites, with a derivatization agent to form polar functional groups at the polyvinyl aromatic nucleus.

27. The process of claim 26 wherein the derivatization agent is selected from the group consisting of carbon dioxide, carbon disulfide, sulfur dioxide, alkylene oxides, aldehydes, ketones, episulfides, halogens, epihalohydrins, halosilanes, halophosphines, phosphorus halide, phosgene, p-haloaniline, cyclic amides, unsaturated amides, isocyanates, diisocyanates, dicarboxylic acid dihalides, dialdehydes, bishaloformates, disulfonyl halides, and cyclic siloxanes.

28. The process of claim 26 wherein the derivatization agent is carbon dioxide and the polar functional groups at the nucleus are carboxyl groups.

29. The process of claim 26 wherein the derivatization agent is carbon disulfide and the polar functional groups at the nucleus are mercaptothiocarbonyl groups.

30. The process of claim 26 wherein the derivatization agent is sulfur dioxide and the polar functional at the nucleus are sulfino groups.

31. The process of claim 26 wherein the derivatization agent is ethylene oxide and the polar functional groups at the nucleus are primary alcohol groups.

32. The process of claim 26 wherein the derivatization agent is propylene oxide and the polar functional groups at the nucleus are a mixture of primary and secondary alcohol groups.

33. The process of claim 26 wherein the derivatization agent is a ketone and the polar functional groups at the nucleus are tertiary alcohols.

34. The process of claim 26 wherein the derivatization agent is octamethyltetrasiloxane and the polar functional groups at the nucleus are siloxanols.

35. The process of claim 26 wherein the derivatization agent is a halogen and the polar functional groups at the nucleus are halides.

36. The process of claim 26 wherein the derivatization agent is an epihalohydrin and the polar functional groups at the nucleus are epoxides.

37. The process of claim 26 wherein the derivatization agent is a halosilane and the polar functional groups at the nucleus are silanes.

38. The process of claim 26 wherein the derivatization agent is a halophosphine and the polar functional groups at the nucleus are phosphines.

39. The process of claim 26 wherein the derivatization agent is a phosphorus halide and the polar functional groups at the nucleus are phosphorus halides.

40. The process of claim 26 wherein the derivatization agent is phosgene and the polar functional groups at the nucleus are carbonyl chlorides.

41. The process of claim 26 wherein the derivatization agent is a p-haloaniline and the polar functional groups at the nucleus are anilines.

42. The process of claim 26 wherein the derivatization agent is a cyclic amide and the polar functional groups at the nucleus are amines or aldehydes.

43. The process of claim 26 wherein the derivatization agent is an isocyanate and the polar functional groups at the nucleus are N-substituted amides.

44. The process of claim 26 wherein the derivatization agent is an aldehyde and the polar functional groups at the nucleus are secondary alcohols.

45. The process of claim 26 wherein the derivatization agent is an episulfide and the polar functional groups at the nucleus are mercaptans.

46. The process of claim 26 wherein the derivatization agent is an unsaturated amide and the polar functional groups at the nucleus are caboxylic acid amides.

47. The process of claim 26 wherein the derivatization agent is a diisocyanate and the polar functional groups at the nucleus are isocyanates.

48. The process of claim 26 wherein the derivatization agent is a dicarboxylic acid dihalide and the polar functional groups at the nucleus are carbonyl halides.

49. The process of claim 26 wherein the derivatization agent is a dialdehyde and the polar functional groups at the nucleus are aldehydes.

50. The process of claim 26 wherein the derivatization agent is a bishaloformate and the polar functional groups at the nucleus are haloformates.

51. The process of claim 26 wherein the derivatization agent is a disulfonyl halide and the polar functional at the nucleus are sulfonyl halides.

* * * * *